(12) United States Patent
Hirohama

(10) Patent No.: US 6,820,476 B2
(45) Date of Patent: Nov. 23, 2004

(54) TIRE PRESSURE MONITORING SYSTEM AND METHOD

(75) Inventor: Tetsuro Hirohama, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/751,890

(22) Filed: Jan. 7, 2004

(65) Prior Publication Data

US 2004/0134270 A1 Jul. 15, 2004

(30) Foreign Application Priority Data

Jan. 9, 2003 (JP) .......................................... 2003-002863

(51) Int. Cl.[7] .............................................. B60C 23/02
(52) U.S. Cl. ................................................... 73/146.5
(58) Field of Search ..................... 73/146, 146.2–146.8; 340/442–447

(56) References Cited

U.S. PATENT DOCUMENTS 5,581,023 A * 12/1996 Handfield et al. .......... 73/146.5
6,243,007 B1 * 6/2001 McLaughlin et al. ........ 340/447
6,591,671 B2 * 7/2003 Brown ....................... 73/146.5

FOREIGN PATENT DOCUMENTS

JP 2000-71726 A 3/2000
JP 2000-103209 A 4/2000

* cited by examiner

Primary Examiner—William Oen
(74) Attorney, Agent, or Firm—Foley & Lardner LLP

(57) ABSTRACT

A tire pressure monitoring system includes a tire pressure detecting device attached to each of tires of a vehicle and detecting a tire pressure, a transmitting device that transmits radio signals indicative of a detected tire pressure of each tire and each corresponding ID code provided to each tire separately, a receiving device attached to a vehicle body side and receiving the radio signals from the transmitting device, and a controller that controls a tire deflation warning. The controller includes an ID code registration section that registers the ID code of each tire by updating data stored in a memory, and a jack-up determination section that determines whether the vehicle has been jacked up. The ID code registration section performs registration of the ID code of each tire when the jack-up determination section determines that the vehicle has been jacked up. A tire pressure monitoring method is also provided.

7 Claims, 3 Drawing Sheets

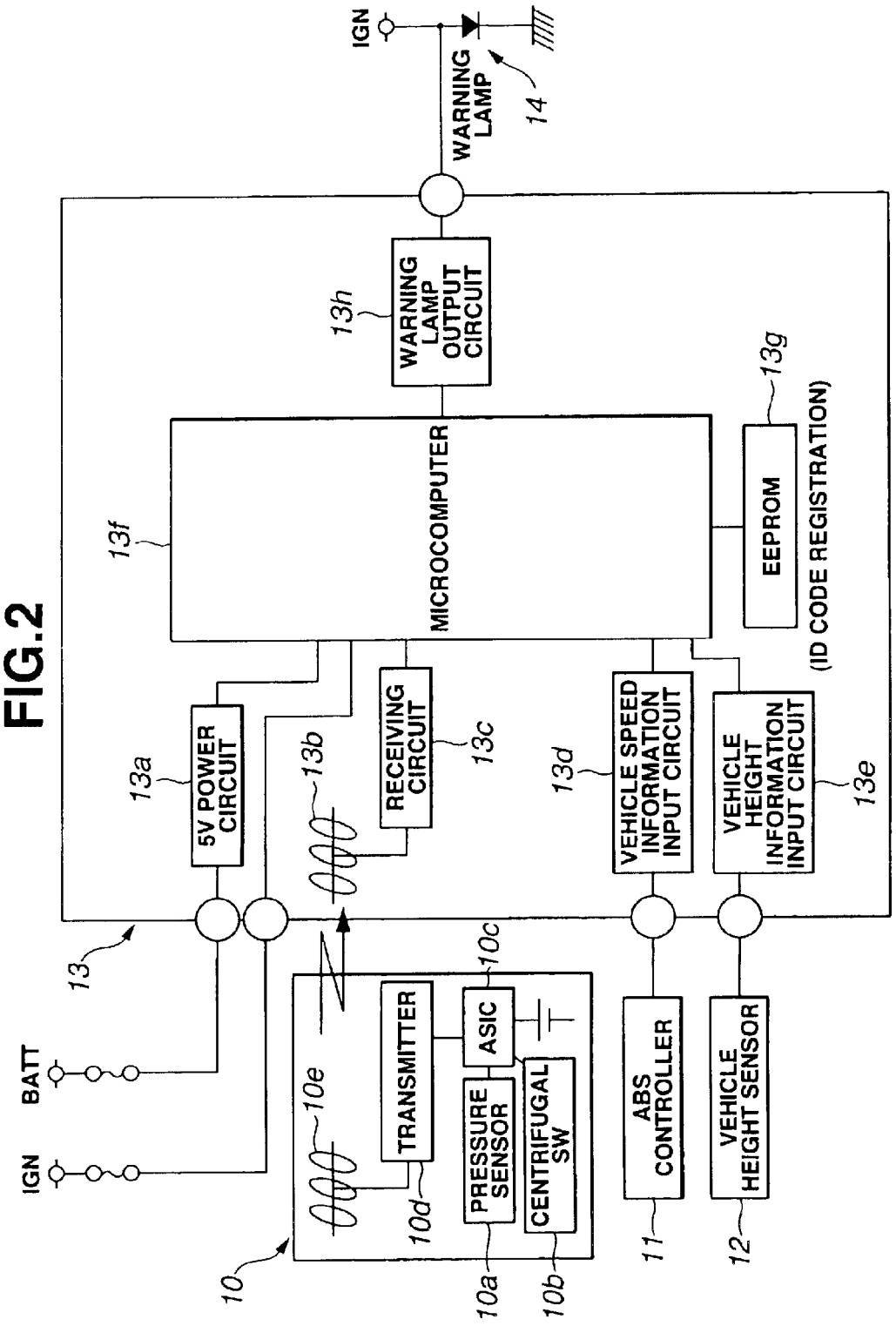

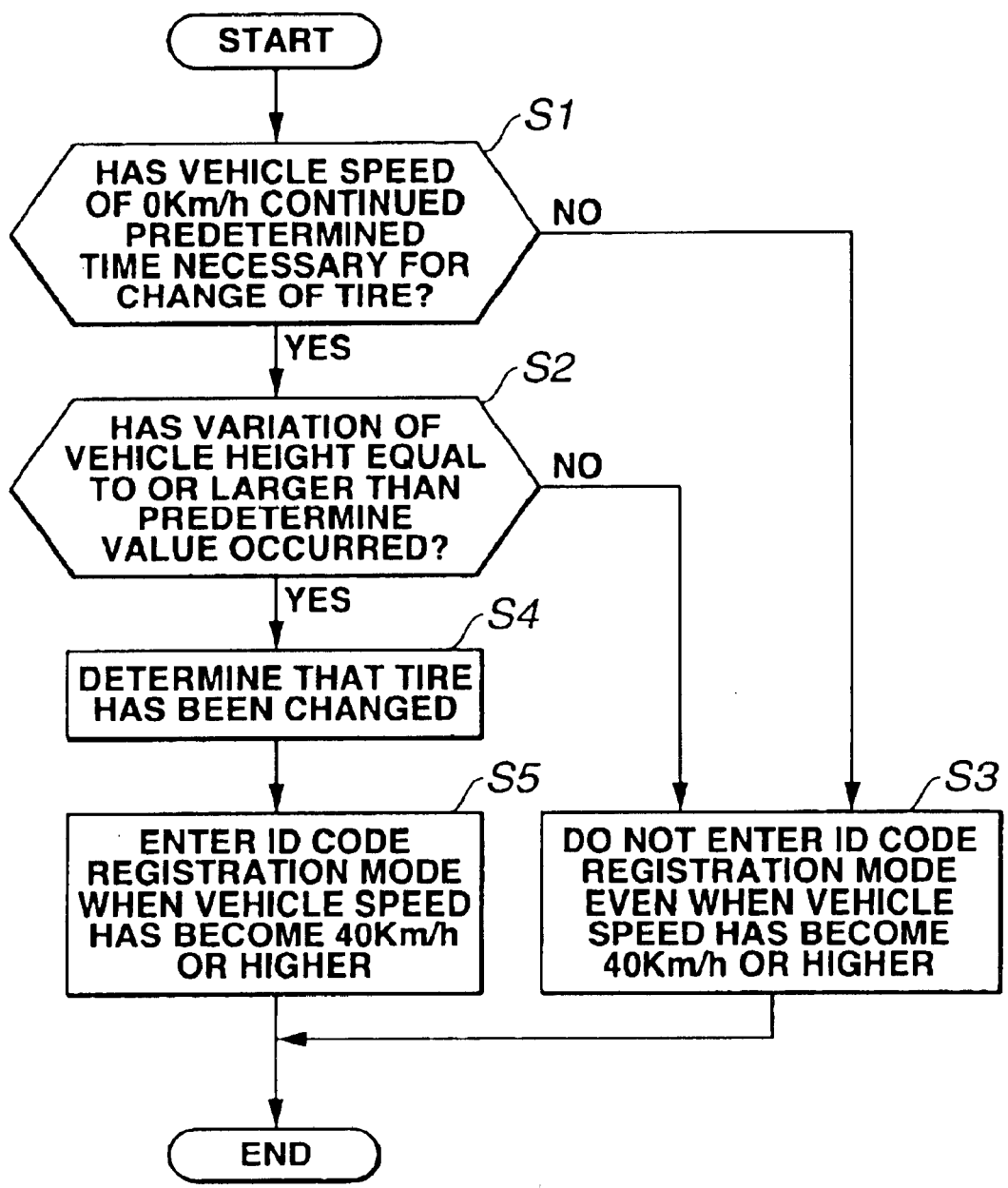

TIRE PRESSURE MONITORING SYSTEM AND METHOD

BACKGROUND OF THE INVENTION

The present invention relates to a tire pressure monitoring system and a method adapted to automatically register tire ID (identification) codes provided to respective tires separately.

An automatic ID code registration logic of a conventional tire pressure monitoring system is adapted to determine running or stoppage of a vehicle based on a vehicle speed. The registration logic finishes an ID code registration mode when the vehicle stops and enters the ID code registration mode when the vehicle speed becomes higher again as disclosed in Unexamined Japanese Patent Publication No. 2000-71726.

SUMMARY OF THE INVENTION

However, the conventional tire pressure monitoring system is encountered by a problem that an ID code registration that is not needed to be performed if a tire is not changed is performed wastefully upon stoppage of a vehicle and accurate detection of the tire pressures cannot be attained during the wasteful ID code registration.

It is accordingly an object of the present invention to provide a tire pressure monitoring system that can eliminate such a wasteful ID code registration and can retain a time for accurate detection of tire pressures.

To achieve the above object, there is provided according to an aspect of the present invention a tire pressure monitoring system comprising a tire pressure detecting device attached to each of tires of a vehicle and detecting a tire pressure, a transmitting device that transmits radio signals indicative of a detected tire pressure of each tire and each corresponding ID code provided to each tire separately, a receiving device attached to a vehicle body side and receiving the radio signals from the transmitting device, and a controller that controls a tire deflation warning, the controller including an ID code registration section that registers the ID code of each tire by updating data stored in a memory, and a jack-up determination section that determines whether the vehicle has been jacked up, wherein the ID code registration section performs registration of the ID code of each tire when the jack-up determination section determines that the vehicle has been jacked up.

According to another aspect of the present invention, there is provided a tire pressure monitoring system comprising tire pressure detecting means provided to each of tires of a vehicle for detecting a tire pressure of each tire, transmitting means for transmitting radio signals indicative of a detected tire pressure of each tire and each corresponding ID code provided to each tire separately, receiving means provided to a vehicle body side for receiving the radio signals from the transmitting means, ID code registration means for registering the ID code of each tire by updating data stored in a memory, and jack-up determination means for determining whether jack-up of the vehicle has been made, wherein the ID registration means performs registration of the ID code of each tire when the jack-up determination means determines that the vehicle has been jacked up.

According to a further aspect of the present invention, there is provided a tire pressure monitoring method comprising detecting a tire pressure of each of tires of a vehicle, transmitting radio signals indicative of a detected tire pressure of each tire together with each corresponding ID code provided to each tire separately, receiving the radio signals, registering the ID code of each tire by updating data stored in a memory, and determining whether the vehicle has been jacked up, wherein the registering the ID code of each tire is performed when the determining determines that the vehicle has been jacked up.

BRIEF DESCRIPTION OF THE DRAWINGS

FIG. 2 is a schematic view of a tire pressure sensor and a tire deflation warning controller of the tire pressure monitoring system of FIG. 1; and FIG. 3 is a flowchart of an ID code registration process that is executed by the tire deflation warning controller of the tire pressure monitoring system of FIG. 1.

DESCRIPTION OF THE PREFERRED EMBODIMENT

Figure 1:
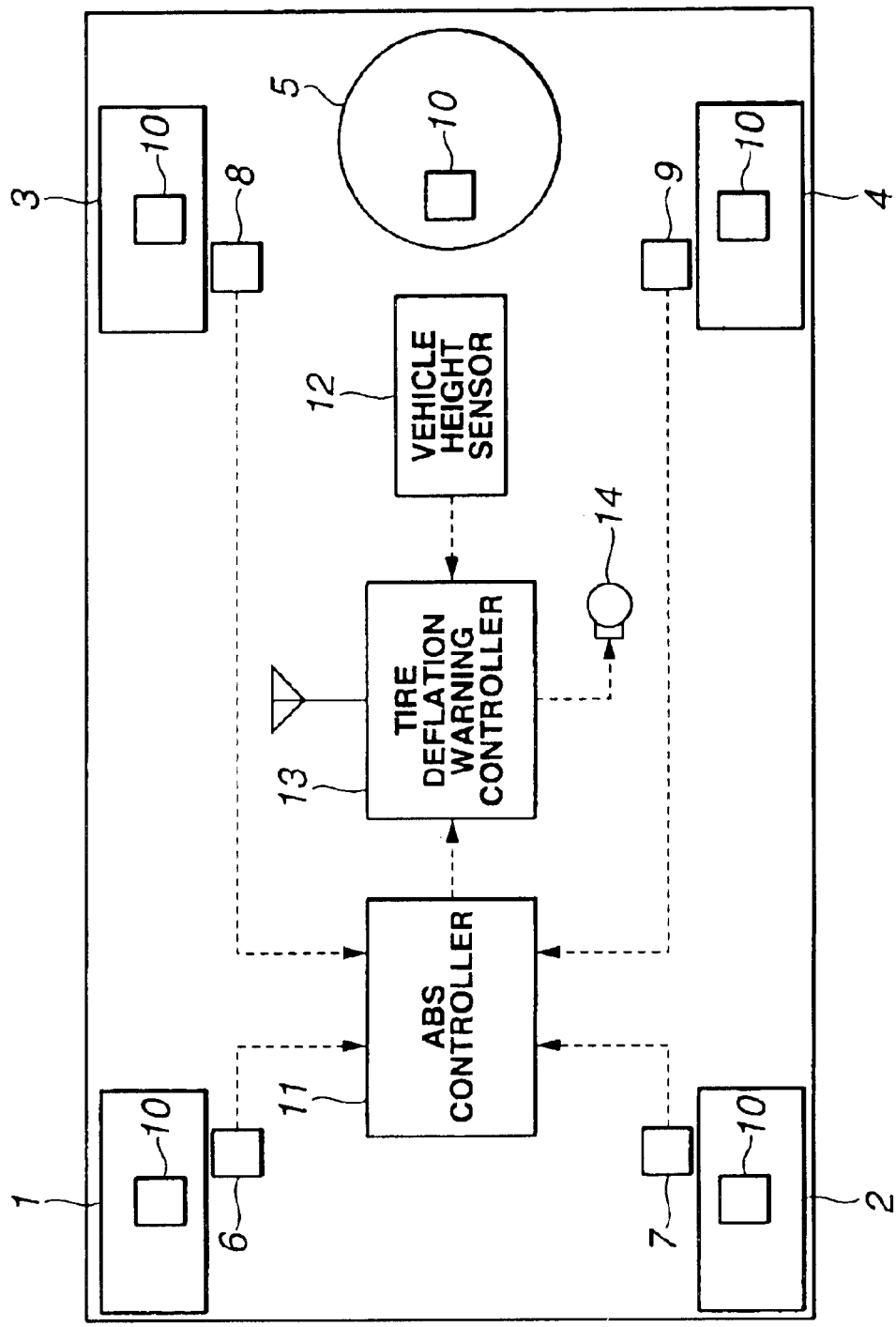
FIG. 1 is a schematic view of a vehicle in which a tire pressure monitoring system according to an embodiment of the present invention is incorporated.

FIG. 1 schematically shows a vehicle in which a tire pressure monitoring system according to an embodiment of the present invention is incorporated. The vehicle includes right front tire 1, left front tire 2, right rear tire 3, left rear tire 4 and spear tire 5. The tire pressure monitoring system includes right front wheel speed sensor 6, left front wheel speed sensor 7, right rear wheel speed sensor 8, left rear wheel speed sensor 9, tire pressure sensors 10, ABS controller (vehicle speed detecting means or device) 11, vehicle height sensor (vehicle height detecting means or device) 12, tire deflation warning controller 13, and tire deflation warning lamp 14.

Right front wheel speed sensor 6, left front wheel speed sensor 7, right rear wheel speed sensor 8 and left rear wheel speed sensor 9 detect the respective wheel speeds of front and rear tires 1, 2, 3, 4 and input wheel speed sensor signals to ABS controller 11.

Tire pressure sensors 10 are attached to respective road wheels of front and rear tires 1, 2, 3, 4 and spare tire 5 to detect tire pressures thereof separately and to transmit data on individual ID codes (tire identification codes), the detected tire pressures and a centrifugal switch signal that will be described later to tire deflation warning controller 13 via radio signals.

ABS controller 11 receives the wheel speed sensor signals from respective wheel speed sensors 6, 7, 8, 9 and transmits wheel speed information (vehicle speed, vehicle acceleration and deceleration and each wheel speed) to tire deflation warning controller 13.

Vehicle height sensor 12 detects a vehicle height at each position where a suspension of each road wheel is disposed, i.e., where each tire 1, 2, 3 or 4 is disposed and outputs vehicle height information to tire deflation warning controller 13. In the meantime, in case the vehicle is provided with an automatic vehicle height controller, a lamp levelizer or the like, a vehicle height sensor employed in such a controller or levelizer is used so as to dispense with vehicle height sensor 12.

Tire deflation warning controller 13 registers ID codes that are provided to the respective tires separately and outputs a lamp turn-on instruction to tire deflation warning lamp 14 when it is determined that at least one of front and rear wheels 1, 2, 3, 4 that is identified by the ID code registration has a decreased tire pressure, i.e., is deflated.

FIG. 2 shows tire pressure sensor 10 and tire deflation warning controller 13 of the tire pressure monitoring system according to an embodiment of the present invention.

Tire pressure sensor 10 includes pressure sensor (tire pressure detecting means or device) 10a that detects a tire pressure, centrifugal switch 10b that opens (i.e., turns off) when a centrifugal force acting on switch 10b is relatively small and closes (i.e., turns on) when the centrifugal force acting on switch 10b is relatively large, ASIC (Application Specific Integrated circuit) 10c that is an integrated circuit for a particular use, transmitter 10d and transmitting antenna 10e. Transmitter 10d and transmitting antenna 10e constitutes a transmitting means or device. By using the opening and closing of centrifugal switch 10b to lengthen the battery life as a trigger, the transmission cycle is changed in two stages, e.g., changed into a cycle of a long transmission interval (e.g., one hour) when the vehicle speed is in a relatively low speed range including stoppage of the vehicle and into a cycle of a short transmission interval (e.g., one minute) when the vehicle speed is in a relatively high speed range higher than the low speed range. Transmitter 10d and transmitting antenna 10e transmits modulated pressure value information from pressure sensor 10a, each individual ID code information of tires 1, 2, 3, 4, 5 and a centrifugal switch signal by using electromagnetic waves.

Tire deflation warning controller 13 includes 5V power circuit 13a, receiving antenna 13b that receives data transmitted from transmitting antenna 10e of tire pressure sensor 10, vehicle speed information input circuit 13d that receives the vehicle speed information from ABS controller 11, vehicle height information input circuit 13e that receives the vehicle height information from vehicle height sensor 12, and microcomputer 13f that receives data from receiving circuit 13c and information from both input circuits 13d, 13e and processes those data and information according to a predetermined control rule. Tire deflation warning controller 13 further includes EEPROM (Electrically Erasable Permanent Read-Only Memory) 13g that is capable of erasing stored information that electrically performs ID code registration, and warning lamp output circuit 13h that makes a determination on the tire pressure of each installed tire (i.e., a tire installed on an axle for running of the vehicle), which tire pressure is one of received data, and outputs a tire deflation warning instruction to tire deflation warning lamp 14 when tire deflation or a decrease in the tire pressure of any one of the installed tires occurs.

The operation of the tire pressure monitoring system described as above is as follows.

[Process of ID code registration of installed tires]

A flowchart of FIG. 3 illustrates a process of an ID code registration of installed tires (tire identification code registration means or section) that is executed in tire deflation warning controller 13.

In step S1, it is determined whether the vehicle speed is zero (0 Km/h) for a predetermined time (i.e., a time necessary for change of a tire, e.g., 15 minutes). If the answer in step S1 is affirmative (i.e., Yes), the process proceeds to step S2. If negative, the process proceeds to step S3.

In step S2, each vehicle height at the moment when the vehicle speed of 0 Km/h has first been detected is compared with a corresponding vehicle height at the moment when the vehicle speed is zero (0 Km/h) for a predetermined time necessary for change of a tire, and it is determined whether the difference between them has become equal to or larger than a predetermined value (i.e., a threshold value used for making determination on jack-up of the vehicle, e.g., 70 mm). If the answer in step S2 is affirmative, the process proceeds to step S4. If negative, the process proceeds to step S3.

In step S3, the process does not enter an ID code registration mode even when the vehicle speed has become 40 Km/h or higher, if it is determined in step S1 that the vehicle speed is not zero (0 Km/h) for a predetermined time or if it is determined in step S2 that a variation of any one of the vehicle heights is not equal to or larger than a predetermined value.

In step S4, it is determined that a tire has been changed if it is determined in step S1 that the vehicle speed is zero (0 Km/h) for a predetermined time and it is determined in step S2 that a variation of one of the vehicle heights is equal to or larger than a predetermined value, and the process proceeds to step S5.

In step S5, the process enters an ID code registration mode if the vehicle speed has become 40 Km/h or higher after it is determined in step S4 that a tire has been changed. In the ID code registration mode, tire deflation warning controller 13 receives ID code information and rewrites or updates ID codes stored in EEPROM 13g.

Steps S1 to S4 constitutes a jack-up determination means or section.

[Installed tire ID code registration]

If the vehicle stoppage condition in step S1 and the vehicle height variation condition in step S2 are satisfied, a process flow following in sequence step S1, step S2, step S4 and step S5 in the flowchart of FIG. 3 is caused. In step S5, the process enters the ID code registration mode if the vehicle speed has become 40 Km/h or higher after it is determined that a tire has been changed.

On the other hand, if at least one of the vehicle stoppage condition and the vehicle height condition is not fulfilled, a process flow following in sequence step S1 and step S3 or step S1 and step S2 and step S3 is caused. In step S3, the process does not enter the ID code registration mode even if the vehicle speed has become 40 km/h or higher.

That is, since a tire cannot be changed unless the vehicle is stopped, it is first determined based on the vehicle information whether or not the vehicle is stopped. Further, change of a tire requires the vehicle to be stopped for a predetermined time, i.e., for at least 15 minutes in case of a vehicle on the market, so that it is determined whether the vehicle is stopped for 15 minutes or more.

To change a tire, it is necessary to jack up a vehicle. If the vehicle is jacked up, one of the vehicle heights becomes higher. In some cases, a lift is used to change a tire. Even in such a case, the tires are caused to move in the rebound direction, so that each vehicle height virtually becomes higher.

A determination on whether the vehicle is jacked up or not is made based on whether one of the vehicle heights corresponding in position to the tire to be changed is increased by a certain amount (e.g., 70 mm or more) or not. To determine the vehicle height, a vehicle height sensor employed in an automatic vehicle height controller or a lamp levelizer can be used instead of vehicle height sensor 12.

If it is determined that the vehicle has been jacked up, it is determined that there is a large possibility of a tire having been changed. Thereafter, if the vehicle speed exceeds 40 Km/h, the process enters an automatic ID code registration mode to register the ID codes of the tires 1, 2, 3, 4, 5 automatically. In this situation, the process enters the automatic ID code registration mode if the vehicle speed has become 40 Km/h or higher. This is because the transmitting cycle is changed so as to provide a long transmitting interval (one hour) when the vehicle speed is in the low range including stoppage of the vehicle and a short transmitting interval (one minute) when the vehicle speed is in a high range (i.e., the range in which the vehicle speed is 40 Km/h or higher).

If the vehicle is not jacked up during stoppage, it is determined that a tire is not changed and the ID code registration is not performed.

The effects of the present invention will now be described.

(1) According to the present invention, there is provided a tire pressure monitoring system which includes pressure sensors 10a attached to respective tires 1, 2, 3, 4 to detect tire pressures of the respective tires, transmitter 10d and transmitting antenna 10e that transmit detected tire pressures together with ID codes provided to the respective tires separately via radio signals, receiving antenna 13b and receiving circuit 13c attached to a vehicle body side that receives the radio signals from transmitting antenna 10e, and ID registration means for registering ID codes of tires 1, 2, 3, 4 installed on axles and used for running of the vehicle by updating data stored in EEROM 13g. Tire deflation warning controller 13 is provided with the jack-up determination means or sections S1 to S4 that determines whether the vehicle has been jacked up and the ID registration means or section S5 that registers the ID codes of installed tires 1, 2, 3, 4 by updating the data of EEPROM 13g when the jack-up determination means or sections S1 to S determines that the vehicle has been jacked up. Thus, by knowing if the vehicle has been jacked up, it can be recognized that there is a high possibility of a tire having been changed. As a result, wasteful ID code registration can be dispensed with and a time for accurate detection of tire pressures can be retained.

(2) According to the present invention, the tire pressure monitoring system includes ABS controller 11 that detects a vehicle speed, and vehicle height sensor 12 that detects a vehicle height at each position where each tire 1, 2, 3 or 4 is disposed. The above-described jack-up determination means or sections S1 to S4 determines that a tire has been changed with the vehicle being jacked up if it is determined in step S1 that a vehicle speed is zero for a predetermined time necessary for change of a tire and if it is determined in step S2 that a variation of the vehicle height is equal to or larger than a predetermined value before a time necessary for change of a tire elapses after stoppage of the vehicle. Thus, based on the vehicle stoppage condition and the vehicle height variation condition, it can be determined accurately whether a tire has been changed with the vehicle being jacked up.

(3) ID registration means or section S5 is adapted so that the process enters the ID code registration mode if it is determined in step S4 that a tire has been changed with the vehicle being jacked up and thereafter the vehicle speed becomes higher than a predetermined value. Therefore, it becomes possible to complete the ID code registration within a short time since the registration is made by a short transmitting cycle, thus making it possible to make shorter the time during which detection of the tire pressures lacks accuracy.

The entire contents of Japanese Patent Applications P2003-002863(filed Jan. 9, 2003) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. A tire pressure monitoring system comprising:
   a tire pressure detecting device attached to each of tires of a vehicle and detecting a tire pressure;
   a transmitting device that transmits radio signals indicative of a detected tire pressure of each tire and each corresponding ID code provided to each tire separately;
   a receiving device attached to a vehicle body side and receiving the radio signals from the transmitting device; and
   a controller that controls a tire deflation warning;
   the controller including:
   an ID code registration section that registers the ID code of each tire by updating data stored in a memory; and
   a jack-up determination section that determines whether the vehicle has been jacked up;
   wherein the ID code registration section performs registration of the ID code of each tire when the jack-up determination section determines that the vehicle has been jacked up.

2. A tire pressure monitoring system according to claim 1, further comprising:
   a vehicle speed detecting device that detects a vehicle speed; and
   a vehicle height detecting device that detects a vehicle height at each position where each tire is disposed;
   wherein the jack-up determination section determines that one of the tires has been changed with the vehicle being jacked up if a condition of a vehicle speed being zero has continued a predetermined time and if a variation of the vehicle height equal to or larger than a predetermined value has occurred before lapse of the predetermined time after stoppage of the vehicle.

3. A tire pressure monitoring system according to claim 2, wherein the ID code registration section enters an ID code registration mode if the jack-up determination section determines that one of the tires has been changed with the vehicle being jacked and thereafter the vehicle speed becomes higher than a predetermined value.

4. A tire pressure monitoring system comprising:
   tire pressure detecting means provided to each of tires of a vehicle for detecting a tire pressure;
   transmitting means for transmitting radio signals indicative of a detected tire pressure of each tire and each corresponding ID code provided to each tire separately;
   receiving means provided to a vehicle body side for receiving the radio signals from the transmitting means;
   ID code registration means for registering the ID code of each tire by updating data stored in a memory; and
   jack-up determination means for determining whether the vehicle has been jacked up;
   wherein the ID registration means performs registration of the ID code of each tire when the jack-up determination means determines that the vehicle has been jacked up.

5. A tire pressure monitoring method comprising:
   detecting a tire pressure of each of tires of a vehicle;
   transmitting radio signals indicative of a detected tire pressure of each tire and each corresponding ID code provided to each tire separately;
   receiving the radio signals;

registering the ID code of each tire by updating data stored in a memory; and determining whether the vehicle has been jacked up;

wherein the registering of the ID code of each tire is performed when the determining determines that the vehicle has been jacked up.

6. A tire pressure monitoring method according to claim 5, further comprising:

detecting a vehicle speed; and detecting a vehicle height at each position where each tire is disposed;

wherein the determining includes determining that one of the tires has been changed with the vehicle being jacked up if a condition of a vehicle speed being zero has continued a predetermined time and if a variation of the vehicle height equal to or larger than a predetermined value has occurred before lapse of the predetermined time after stoppage of the vehicle.

7. A tire pressure monitoring method according to claim 6, wherein the registering comprising entering an ID code registration mode if the determining determines that one of the tires has been changed with the vehicle being jacked up and thereafter the vehicle speed becomes higher than a predetermined value.

* * * * *